No. 864,842. PATENTED SEPT. 3, 1907.
J. R. HAPPER.
ELECTRIC DRIVE FOR PAPER MAKING AND LIKE MACHINES.
APPLICATION FILED JAN. 4, 1907.

2 SHEETS—SHEET 1.

UNITED STATES PATENT OFFICE.

JAMES ROBERT HAPPER, OF LINWOOD, SCOTLAND, ASSIGNOR OF ONE-HALF TO JAMES BERTRAM AND SON LIMITED, OF EDINBURGH, SCOTLAND.

ELECTRIC DRIVE FOR PAPER-MAKING AND LIKE MACHINES.

No. 864,842.	Specification of Letters Patent.	Patented Sept. 3, 1907.

Application filed January 4, 1907. Serial No. 350,762.

*To all whom it may concern:*

Be it known that I, JAMES ROBERT HAPPER, a subject of the King of the United Kingdom of Great Britain and Ireland, and residing at Linwood, Renfrewshire, Scotland, have invented certain new and useful Improvements in Electric Drives for Paper-Making and Like Machines, of which the following is a specification.

This invention relates to a system for electrically driving paper making or like machines composed of sections where the relative speeds of such sections must be capable of variation as for example to provide for suitable draw of a paper web through a paper making machine; and it has for its object to obviate the use of cumbrous and costly mechanical arrangements in vogue for this purpose by providing a separate electric motor for each section, the motors being supplied with current from a main generator and so connected that the whole may be driven at uniform or variable speed and the speed of each or any of the motors may be varied; a further advantage obtained by the invention being that it allows all regulation of the different sections to be carried out from the front of the machine, a feat practically unattainable under existing mechanical methods and done in a fraction of the time and with greater exactitude while reducing the risk of injury to person.

The invention is applicable to any section or several parts of any machine, where all the sections or parts require to be started, stopped, or varied in speed simultaneously by one movement of one instrument and when varied still maintain the relative speeds one to the other or at the same time allow any section or part of a machine to be started, stopped or varied in speed independently of another.

Figure 1:
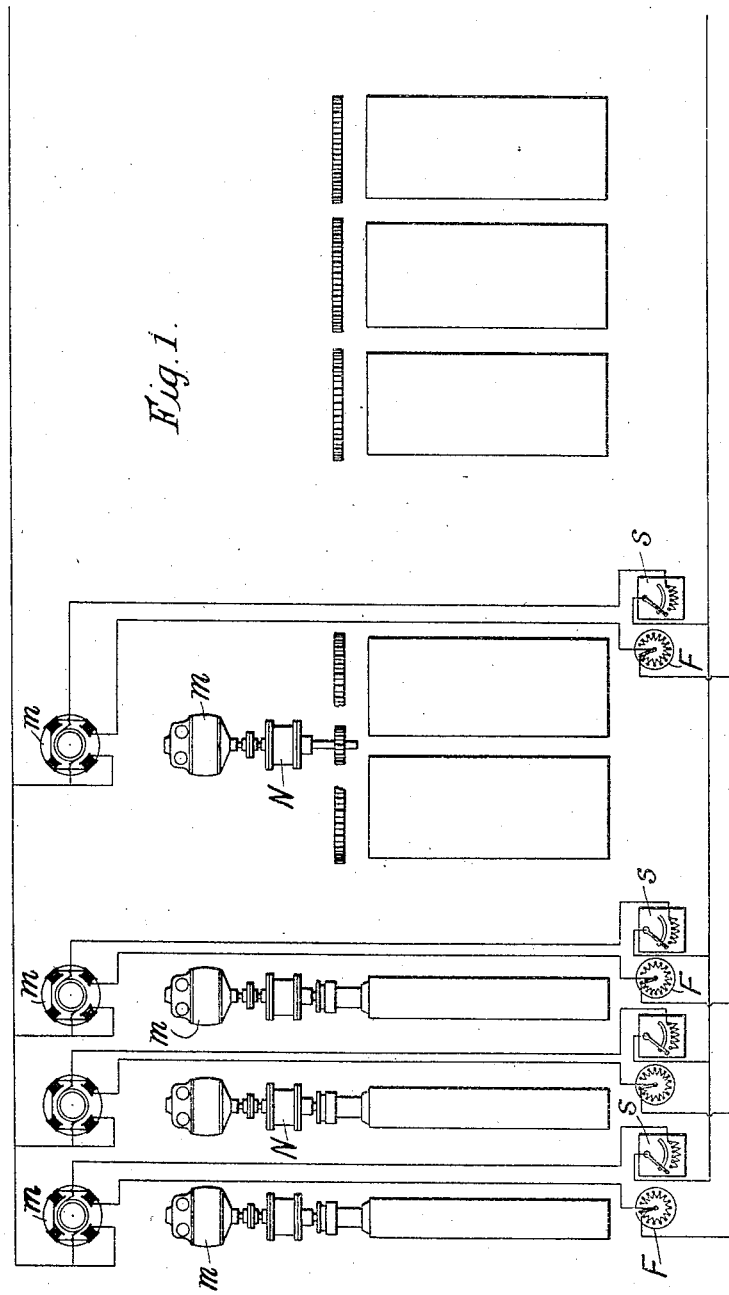
Figure 2:
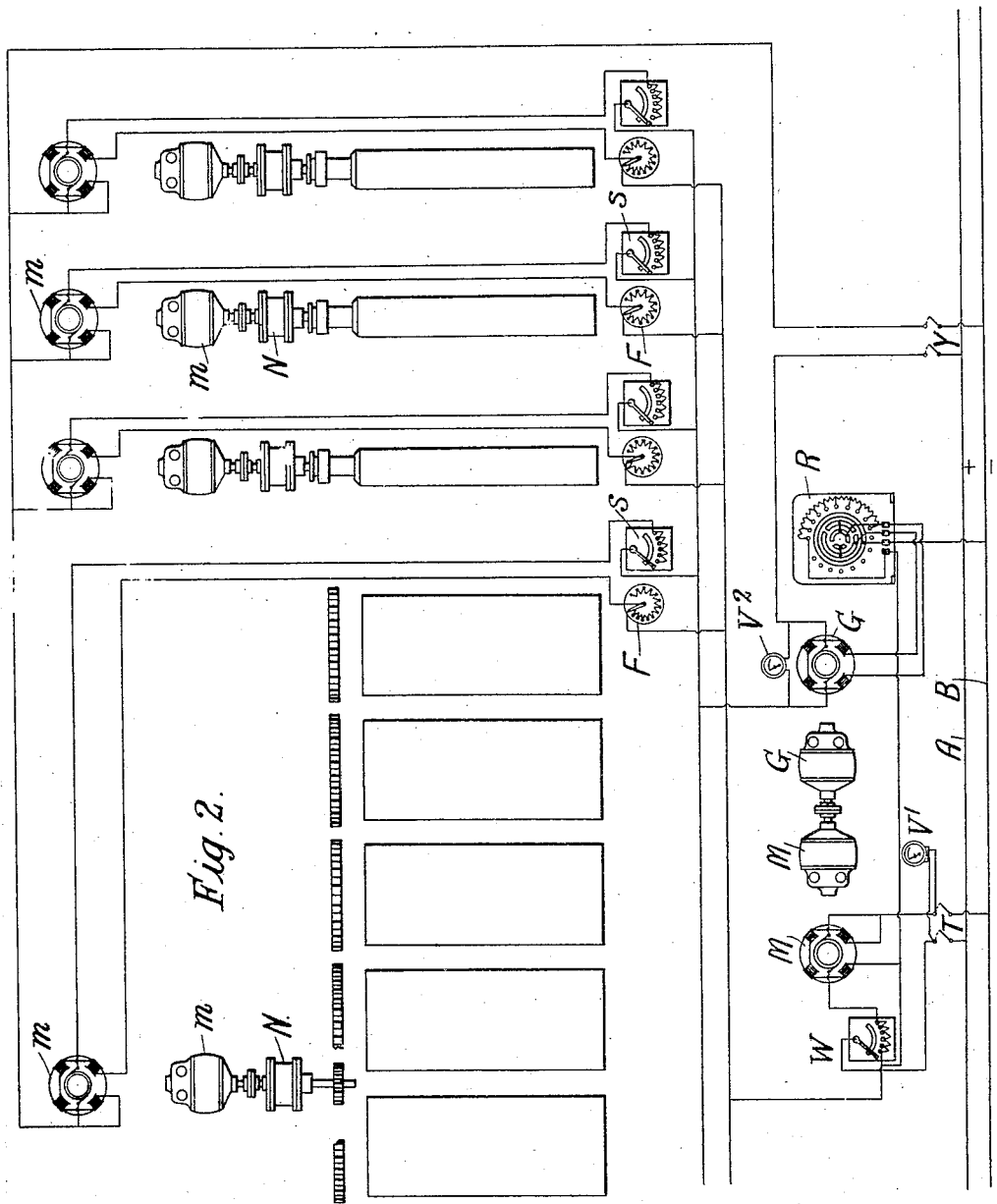

In the accompanying drawing which illustrates the invention, Figure 1 is a more or less diagrammatic view showing the left hand half of a paper making machine; Fig. 2 is a like view to the same scale showing the right hand half.

As shown, the system forming the subject of the invention comprises two main cables A, B, one A being positive the other B negative, which convey a continuous electric current at any predetermined voltage from any suitable source of generation. From those mains current is taken at a constant voltage to drive a continuous current motor M of any suitable power at a constant or varying speed. This motor in turn drives a dynamo or generator G of any suitable power which can generate a continuous current at a voltage which may be increased to equal if not exceed the maximum voltage available from the main supply.

In the field circuit of the generator G is inserted a regulating resistance R with current reversing contacts whereby the electromotive force of the generator can be regulated from zero to any desired maximum in either direction. This electromotive force may thus act in direct opposition to that from the main supply; or when the current is reversed the electromotive force from the generator will be added to that from the main supply.

It will be seen that by means of the resistance R the current through the field of the generator can be weakened to zero rendering the electromotive force from the generator nil, and when that point is reached by still continuing the same movement of the resistance handle the switch contacts are changed over or reversed, and as the movement of the handle is continued more resistance coils are cut out allowing the current to increase from zero to its maximum and to pass through the field coils in the opposite direction, consequently reversing the polarity of the generator. It will therefore be understood that by this means the voltage from the generator G can be made to exactly oppose or be equivalent to the voltage from the main supply, allowing no current in any direction, or it may be decreased gradually volt by volt till there is no pressure in opposition to that from the main supply, then when that point is reached as already mentioned the polarity of the generator is reversed and it is then possible to add volt by volt to that of the mains, serving to increase the total voltage to an amount equivalent to the sum of the maximum voltage from the main supply plus the maximum voltage from the generator.

A motor $m$ is coupled up to each section or part of a machine, either direct or through speed reducing gear inclosed in a box N; all said motors working at a speed proportionate to one another, which speed depends on the voltage passing through and from the generator G. For each motor is provided a starting switch $s$, and a shunt regulating resistance F is inserted in the field circuit, the field coils being excited by current of any suitable constant voltage so that the speed of any motor may be regulated within any required limits independently of the others.

Referring to the drawings, when the attendant wishes to put the machine in motion all the switches being at off position he puts in a double pole switch T. The exact voltage across the mains being indicated on the voltmeter $V^1$. The motor M which drives the generator G is then started, when the starting switch W is actuated. From a terminal of this starting switch W are taken the connections for the field coils of the various motors $m$ and also for the field coils of the generator G. The rise of voltage is observed on the two-ways reading volt meter $V^2$ which indicates the drop of voltage across the terminals of the generator G.

When the handle of the resistance R is at off position there is no resistance in the generator shunt circuit and the connections are adjusted so that the electro-motive force generated is in direct opposition to that from the main supply. When the attendant notices that the volt-meters V¹ and V² read alike he puts in the double-pole-switch Y. He then moves round the handle of the shunt regulator R inserting more resistance at each step and reducing the retarding voltage of the generator gradually lower and lower to whatever voltage he desires, and further if he wishes he will reverse the functions of the generator allowing it then to boost or assist the main supply until the desired E. M. F. is obtained. Each section of the machine is then started up and when all the sections are running paper is led over the first section, thence to the second section and so on. As the paper is led over, the attendant adjusts accurately by the rheostats of each motor, the speed of the sections relative to one another and to suit the various draws required for the paper in its advancing stages and which vary according to shrinkage due to drying by heat and to the nature of the different materials from which it is made.

When the paper is led over all the sections, if the operator desires to increase or decrease the speed of the whole simultaneously, he can do so by means of the regulating and reversing rheostat R.

Having now described our invention what we claim and desire to secure by Letters Patent of the United States is:—

The herein described system of electrically driving paper making or like machines composed of sections driven at variable speed, comprising the combination with supply mains of means such as a motor generator for generating a current of variable voltage which may be opposed or added to that from the mains and a separate motor provided for each section having its own regulating device and driven by the current from the mains and the generator.

In testimony whereof I have signed my name to this specification in the presence of two subscribing witnesses.

JAMES ROBERT HAPPER.

Witnesses:
WALLACE FAIRWEATHER,
JOHN ARMSTRONG, Jun.